US006222605B1

(12) United States Patent
Tillin et al.

(10) Patent No.: US 6,222,605 B1
(45) Date of Patent: Apr. 24, 2001

(54) SURFACE MODE LIQUID CRYSTAL DEVICE AND METHOD OF MAKING A LIQUID CRYSTAL DEVICE

(75) Inventors: Martin David Tillin, Oxfordshire; Edward Peter Raynes; Michael John Towler, both of Oxford, all of (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/727,972

(22) Filed: Oct. 9, 1996

(30) Foreign Application Priority Data

Oct. 13, 1995 (GB) .................................. 9521043

(51) Int. Cl.⁷ ........................ G02F 1/139; G02F 1/1337
(52) U.S. Cl. ........................ 349/167; 349/177; 349/183; 349/191; 349/128
(58) Field of Search .............................. 349/33, 34, 132, 349/136, 86, 167, 175, 177, 179, 183, 191

(56) References Cited

U.S. PATENT DOCUMENTS

| 4,385,806 | 5/1983 | Fergason | 350/347 |
| 4,635,051 | 1/1987 | Bos | 340/757 |
| 5,231,522 | * 7/1993 | Sumiyoshi | 349/124 |

FOREIGN PATENT DOCUMENTS

| 0616240 | 9/1994 | (EP) . |
| 2276730 | 10/1994 | (GB) . |
| 2286896 | 8/1995 | (GB) . |

OTHER PUBLICATIONS

Scheffer et al "A New, Highly Multiplexable Liquid Crystal Display", Appl. Phys. Letter 45(10) Nov. 1984—pp. 1021–1023.*

D. S. Fredley et al., The Conference Record of the International Display Research Conference, "Polymer Stabilized SBE Devices", pp. 480–483, 1994. (Previously Submitted).

Heinz J. Deuling, Molecular Crystals and Liquid Crystals, "Deformation of Neumatic Liquid Crystal in an Electric Field", vol. 19, pp. 123–131, 1972. (Previously Submitted).

Konno et al., Proceedings of the Fifteenth International Display Research Conference, "OCB–Cell Using Polymer Stabilized Bend Alignment", pp. 581–583, Oct. 16, 1995.

Hasebe et al.,Japanese Journal of Applied Physics, Effect of Polymer Network Made of Liquid Crystalline Diacrylate on Characteristics of Liquid Crystal Display Device:, vol. 33, No. 11,pp. 6245–6248, Nov. 1994.

Bos et al., SID 93 Digest, "Molecular Crystals and Liquid Crystals", vol. 113, pp. 329–339, 1984.

European Search Report mailed Feb. 19, 1998 for 96307391.1.

Heinz J. Deuling, Molecular Crystals and Liquid Crystals, 1972, vol. 19. "Deformation of Nematic Liquid Crystal in an Electric Field", pp. 123–131.

(List continued on next page.)

Primary Examiner—William L. Sikes
Assistant Examiner—Tai V. Duong

(57) ABSTRACT

A surface mode liquid crystal device is made by forming a cell containing a mixture of a liquid crystal and a pre-polymer. An electric field is applied across the cell to arrange the liquid crystal in a predetermined surface mode state, such as the V state in the case of a pi-cell configuration. The liquid crystal is held in this state by the field while the pre-polymer is polymerized or cross-linked, for instance by ultraviolet irradiation. The electric field is then removed. The polymer stabilizes the predetermined surface mode state, for instance preventing relaxation of the V state to twist or splay state in the pi-cell configuration.

21 Claims, 4 Drawing Sheets

OTHER PUBLICATIONS

P.D. Berezin et al., Sov. J. Quant. Electron., vol. 3, No. 1, Jul.–Aug. 1973, "Electrooptic Switching in Oriented Liquid–Crystal Films", pp. 78–79.

Philip J. Bos et al., Mol. Cryst. Liq. Cryst., 1984, vol. 113, "The pi–CELL: A Fast Liquid–Crystal Optical–Switching Device", pp. 329–339.

D. K. Yang et al., The Conference Record of the International Display Research Conference, "Cholesteric Liquid Crystal/Polymer Gel Dispersion Bistable at Zero Field", pp. 49–52. 1994.

D. S. Fredley et al., The Conference Record of the International Display Research Conference, "Polymer Stabilized SBE Devices", pp. 480–483, 1994.

J. W. Doane et al, Japan Display 1992 "Front–Lit Flat Panel Display from Polymer Stabilized Cholesteric Textures", pp. 73–79.

International Search Report of the U.K. Application GB9521043.1: dated Dec. 7, 1995.

T. Miyashita et al., Proceedings of the 13th International Display Research Conference, "Wide Viewing Angle Display Mode for Active Matrix LCD Using Bend Alignment Liquid Crystal Cell", pp. 149–152.

* cited by examiner

SURFACE MODE LIQUID CRYSTAL DEVICE AND METHOD OF MAKING A LIQUID CRYSTAL DEVICE

The present invention relates to a liquid crystal device and to a method of making a liquid crystal device. Such devices may be used to provide fast switching liquid crystal displays having applications in television, computer displays, and three dimensional displays. Such devices may also be used in optical systems requiring fast polarisation switches, spatial light modulators, and optical shutters for instance for optical communications.

The term "surface mode liquid crystal device" as used herein means a liquid crystal device in which optical change caused by varying the field across the liquid crystal occurs primarily in the surface layers of the liquid crystal. One example of such a device is known as a pi-cell, in which the liquid crystal is disposed between alignment layers which create parallel alignment. This may be achieved by providing polyimide alignment layers which are rubbed in the same direction. Another example of such a device is known as a Fredericks cell, in which the liquid crystal is disposed between alignment layers which create antiparallel alignment. For instance, the display may have polyimide alignment layers rubbed in opposite directions. Other types of surface mode liquid crystal devices are possible, for instance employing parallel alignment but operating in a splay state as described hereinafter.

Surface mode liquid crystal devices (LCDs) are disclosed in Mol Cryst. Liq. Cryst., 1972, 19, 123–131 "Deformation of Nematic Liquid Crystals in an Electric Field", Sov. J. Quant. Electron., 1973, 3, 78–9, "Electro-Optic Switching in Oriented Liquid Crystal Films", and U.S. Pat. No. 4,385,806. LCDs of the pi-cell type are disclosed in Mol Cryst. Liq. Cryst., 1984, 113, 329–339, "The Pi-cell: A Fast Liquid Crystal Optical Switching Device.", U.S. Pat. No. 4,635,051 and GB 2 276 730. A typical known pi-cell structure comprises a liquid crystal layer disposed between parallel-rubbed polyimide alignment layers and provided with suitable addressing electrodes. A retarder whose optic axis is perpendicular to the alignment direction of the liquid crystal layer may be disposed adjacent the layer so as to compensate for the retardation of the layer and thus lower the required operating voltage range by allowing zero retardation to be achieved at a finite voltage. This assembly is sandwiched between crossed linear polarisers whose polarisation vectors are at 45 degrees to the optic axes of the liquid crystal layer and the retarder. A display using this structure provides fast switching times between on and off states, for instance of the order of a millisecond or less.

In the absence of an electric field across the liquid crystal layer, the liquid crystal is in a splay mode, as described in more detail hereinafter. For the display to operate in the pi-cell mode, the liquid crystal has to be transformed in to the V state, as also described hereinafter in more detail, by the application of a suitable electric field. However, when a suitable field is initially applied, it takes several seconds for the display to change to the V state. Transformation from the splay state to the V state occurs when the voltage across the cell electrodes exceeds a critical voltage and the drive voltage for the cell must therefore always exceed this critical voltage during operation of the display. If the drive voltage falls below a critical value, the liquid crystal relaxes to a twisted state, in which there is a 180 degree twist of the liquid crystal between the alignment surfaces.

The Conference record of the International Display Research Conference, 1991, 49–52 "Cholesteric Liquid Crystal/Polymer Gel Dispersion Bistable at Zero Field" discloses the use of a polymer to stabilise cholesteric features of a LCD. The display is formed by adding a small quantity of monomer to a cholesteric liquid crystal. Polymerisation of the monomer alters the switching properties of the display such that two quasi-stable states are formed. These states can exist in the absence of an applied field across the liquid crystal and can be addressed by appropriate voltage pulses across the liquid crystal. This paper alleges that the liquid crystal/polymer gel dispersion is responsible for creating these quasi-stable states.

The Conference record of the International Display Research Conference, 1994, 480–483, "Polymer Stabilised SBE Devices" discloses a technique for inducing a bulk pretilt of the liquid crystal in super-twisted birefringent effect (SBE) devices also known as super-twisted nematic (STN) devices. A monomer is added to the liquid crystal and is polymerised while applying a voltage across the liquid crystal cell. The effect of the polymer is to eliminate stripe formation from SBE or STN displays by inducing a bulk pretilt of the liquid crystal.

GB 2 286 896 discloses LCD's in which isolated pockets or regions of liquid crystal are formed by polymerising or cross-linking relatively high concentrations of pre-polymers.

According to a first aspect of the invention, there is provided a method as defined in the appended Claim 1.

According to a second aspect of the invention, there is provided a device as defined in the appended Claim 12.

According to a third aspect of the invention, there is provided a device as defined in the appended Claim 13.

Preferred embodiments of the invention are defined in the other appended claims.

It is thus possible to provide a surface mode liquid crystal device which is stabilised in a predetermined surface mode state. For instance, in the case of a pi-cell stabilised in the V state, the V state is retained in the absence of an applied field across the liquid crystal. The V state is retained in the absence of a field so that no time is required to reform the V state after the device has been switched off. Further, such a device may be used with a drive scheme in which one drive voltage is zero. The wide viewing angle of the pi-cell mode is unaffected by this process. The effect on switching speed or response time of the device is relatively small so that the device retains the advantages of pi-cells while overcoming the disadvantages described hereinbefore.

The invention will be further described, by way of example, with reference to the accompanying drawings, in which.

Figure 1:
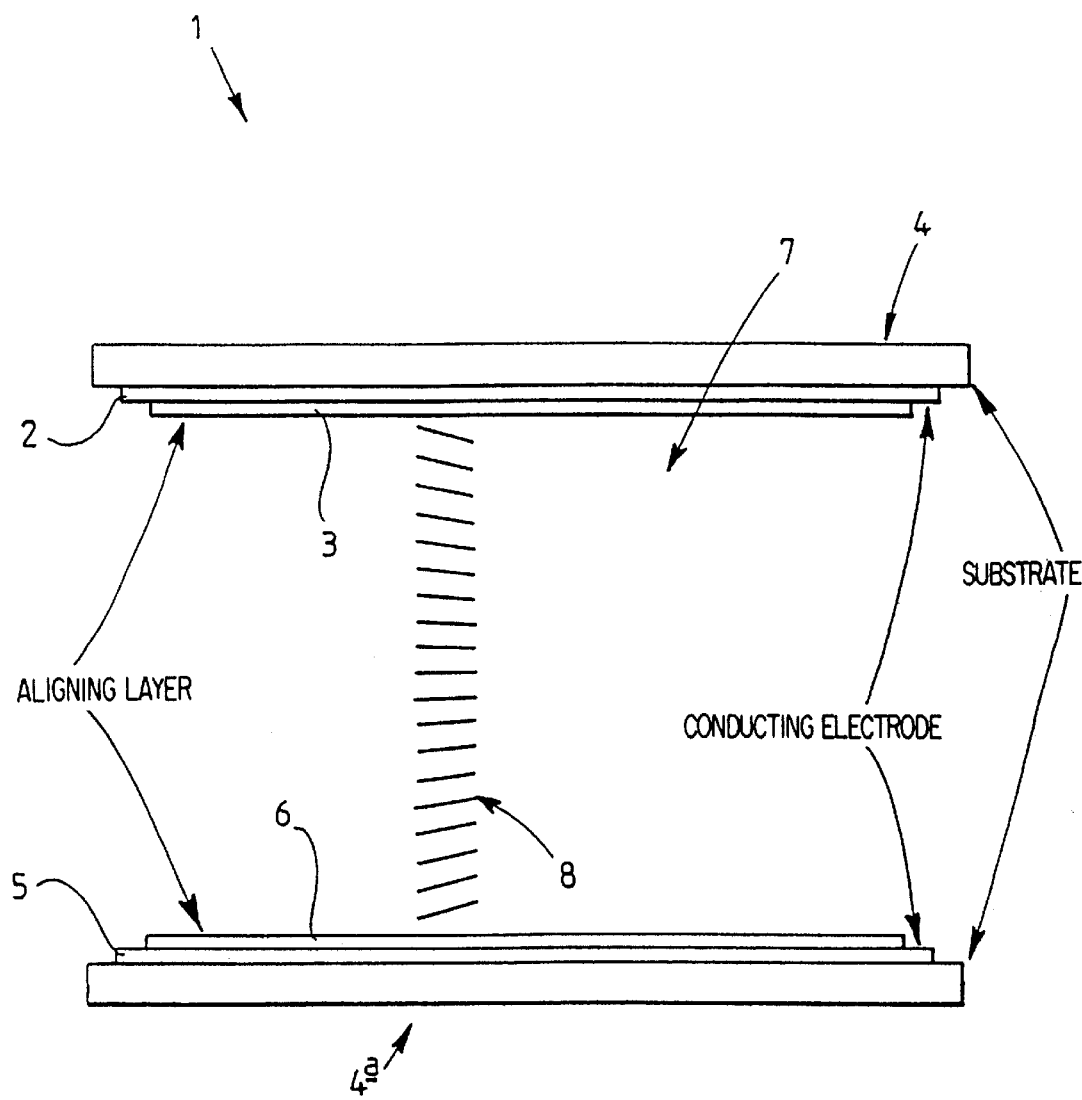
FIG. 1 is a schematic diagram illustrating a pi-cell LCD in a splay state.

FIG. 1 shows a liquid crystal device comprising a cell 1 having a first substrate 4 on which are deposited a conducting electrode 2 and an aligning layer 3. A second substrate 4a similarly carries a conducting electrode 5 and an aligning layer 6. A liquid crystal 7 forms a layer between the aligning layers 3 and 6. The aligning layers 3 and 6 comprise polyimide layers which have been subjected to rubbing substantially parallel and in the same direction so as to provide parallel (as opposed to anti-parallel) alignment. However, any suitable technique may be used for achieving the desired alignment. Such techniques include oblique evaporation (for instance of silicon dioxide), illumination of certain materials by polarised light, and surface relief profile, for instance in the form of diffraction gratings.

FIG. 1 illustrates the splay state of the cell which is the state adopted by the liquid crystal 7 in the absence of an electric field, in particular in the absence of a potential difference between the electrodes 2 and 5. The directors of the liquid crystal molecules are illustrated by the short lines at 8. At the surfaces of the aligning layers 3 and 6, the directors are substantially parallel to each other (in the plane of the cell) and point in the same direction. The liquid crystal directors at the aligning layers 3 and 6 have a pretilt of the order of between 1 and 10 degrees with respect to the surfaces of the aligning layers 3 and 6. The directors of the liquid crystal throughout the cell are parallel or nearly parallel to each other as illustrated.

Figure 2:
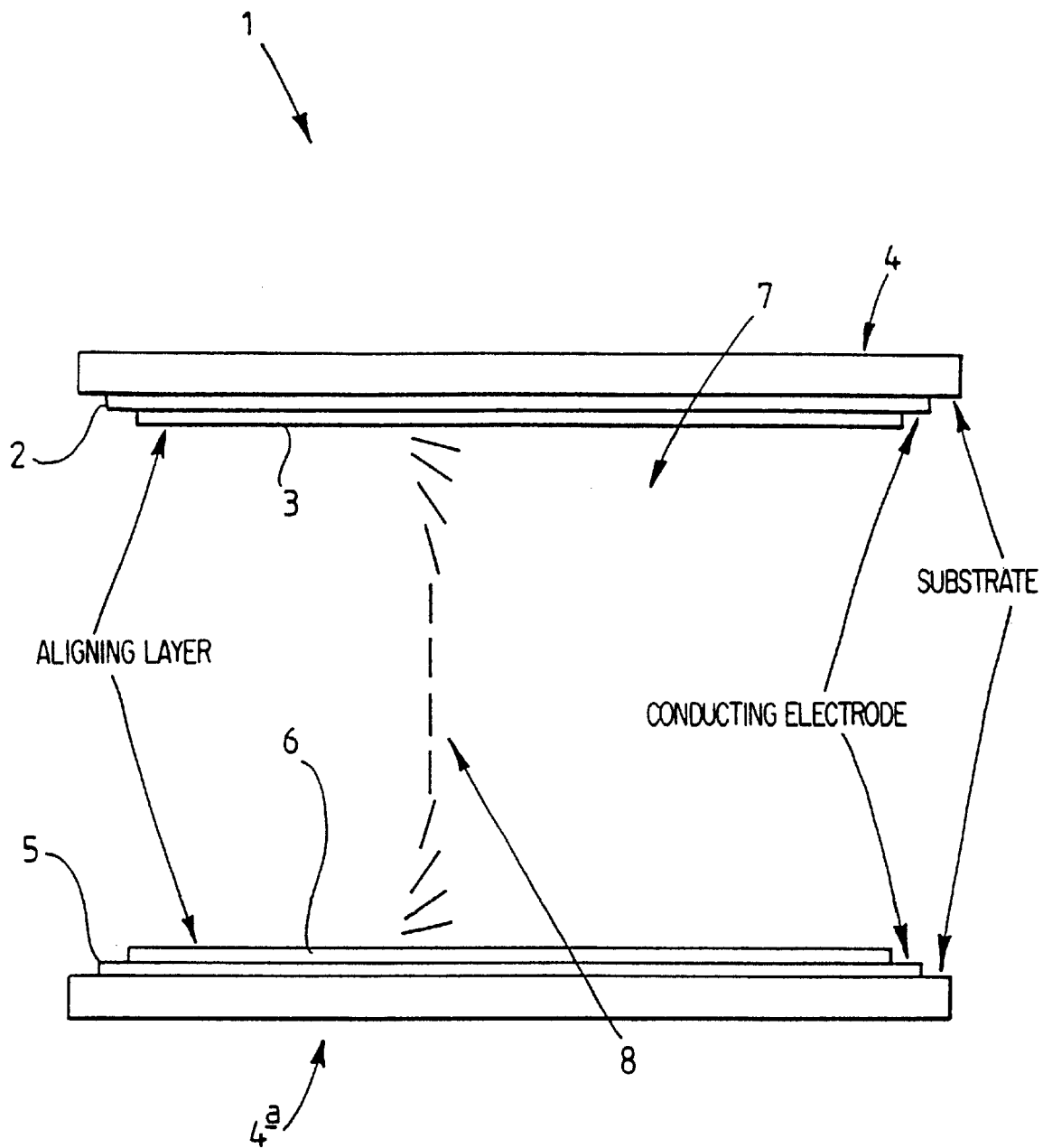
FIG. 2 is a schematic diagram illustrating the cell of FIG. 1 in the V state.

In order to establish pi-cell operation, the liquid crystal has to be changed to the V state as shown in FIG. 2. An alternating voltage is applied between the electrodes 2 and 5 with an RMS amplitude greater than a threshold value, which is of the order of 1.5 to 2 volts for the liquid crystal material E7, so that the liquid crystal changes from the splay state to the V state illustrated by the liquid crystal molecule directors in FIG. 2. As described hereinbefore, it takes some time for the V state to be established, typically of the order of seconds or even minutes. Once the V state has been established, in known cells, the drive voltage must not fall below a predetermined value in order to maintain pi-cell operation in the V state. During normal operation in the pi-cell mode, the directors in the liquid crystal layers adjacent the aligning layers 3 and 6 change direction in accordance with the amplitude of the voltage applied between the electrodes 2 and 5. This causes the retardation of the cell to vary and this effect may be used to provide a display as described hereinafter.

When the drive voltage applied to the electrodes 2 and 5 is reduced below a critical voltage (typically about 1.2 to 1.6 volts for the liquid crystal material E7), the liquid crystal 7 relaxes from the V state to the twist state. If the drive voltage remains below this voltage for any substantial time, the twist state gradually relaxes further to the splay state, which typically takes from less than a second to a few minutes. If a suitable drive voltage is re-applied to the cell when in the twist state, the liquid crystal 7 may be returned directly to the V state, although the response times for the transistions to and from the twist state are very much slower than typical response times for switching within the V state. However, if any domains of splay have formed in the twist regions, the initial slow transition from the splay state to the V state must be repeated to remove these domains.

In order to stabilise the V state, a cell of the type shown in FIGS. 1 and 2 is formed. However, the liquid crystal 7 includes a small quantity of a pre-polymer which may, for instance, be liquid crystalline or non-mesogenic. The pre-polymer may, for instance, comprise a monomer, an oligomer, a polymer capable of further cross-linking or a mixture of such compounds. A drive voltage of sufficient amplitude to change the liquid crystal to the V state is applied between the electrodes 2 and 5 and, once the V state has been established, the pre-polymer is cross-linked or polymerised, for instance by ultraviolet irradiation, while maintaining the drive voltage between the electrodes 2 and 5. When polymerisation or cross-linking is complete, the drive voltage may be removed. However, instead of relaxing to the splay state, the liquid crystal 7 is stabilised in the V state and remains in this state irrespective of whether a drive voltage is applied between the electrodes 2 and 5. Accordingly, the cell functions immediately upon applying a drive voltage, which voltage may have zero amplitude for one state of the pi-cell. Thus, the inconvenience of having to wait for the V state to form when a drive voltage is applied is eliminated. Further, during operation, the inconvenience of having to maintain a drive voltage greater than a predetermined amplitude is also eliminated, which allows simpler and more convenient drive arrangements for the cell.

Figure 3:
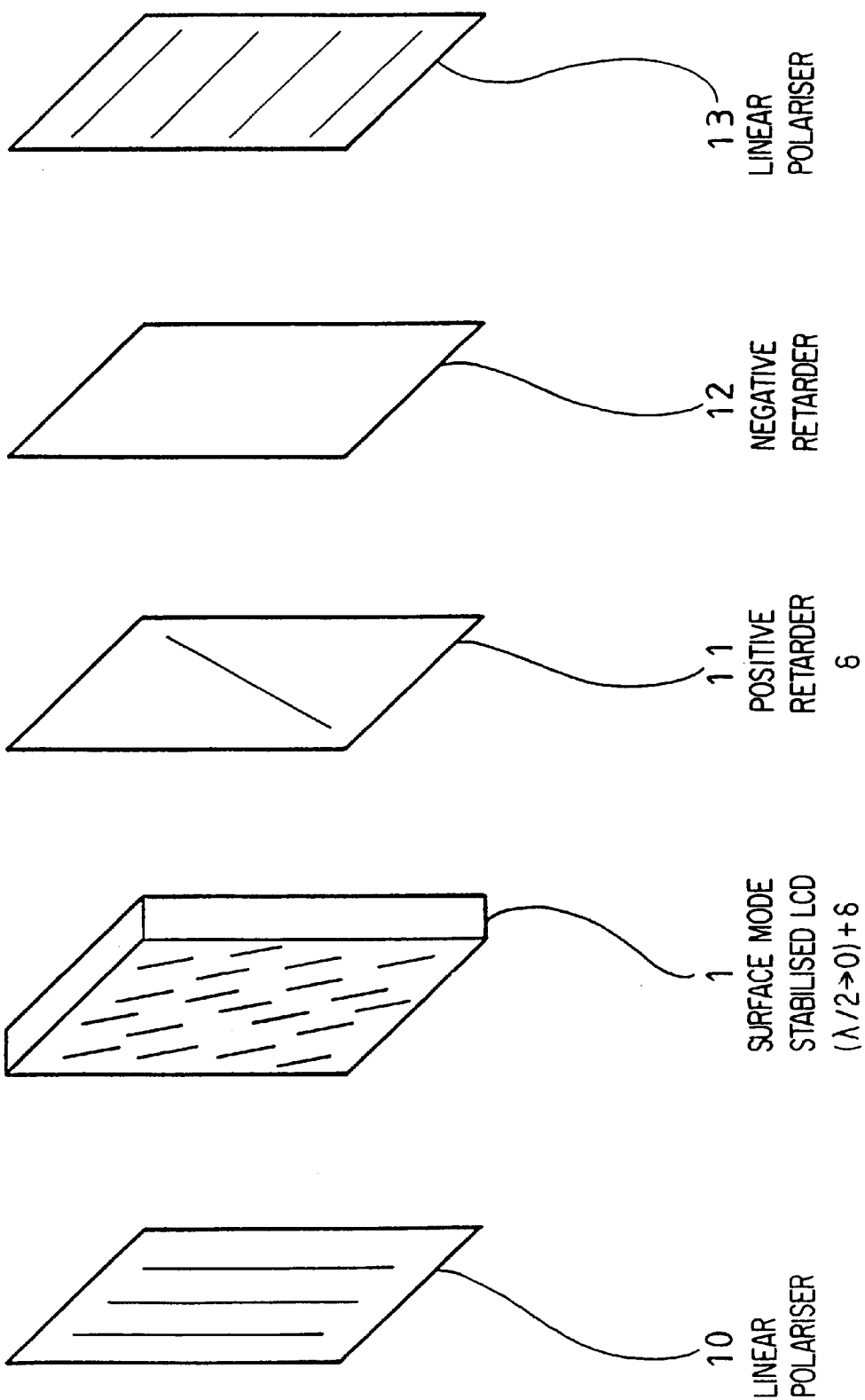
FIG. 3 is a schematic diagram illustrating a LCD incorporating the cell of FIG. 1.
Figure 4:
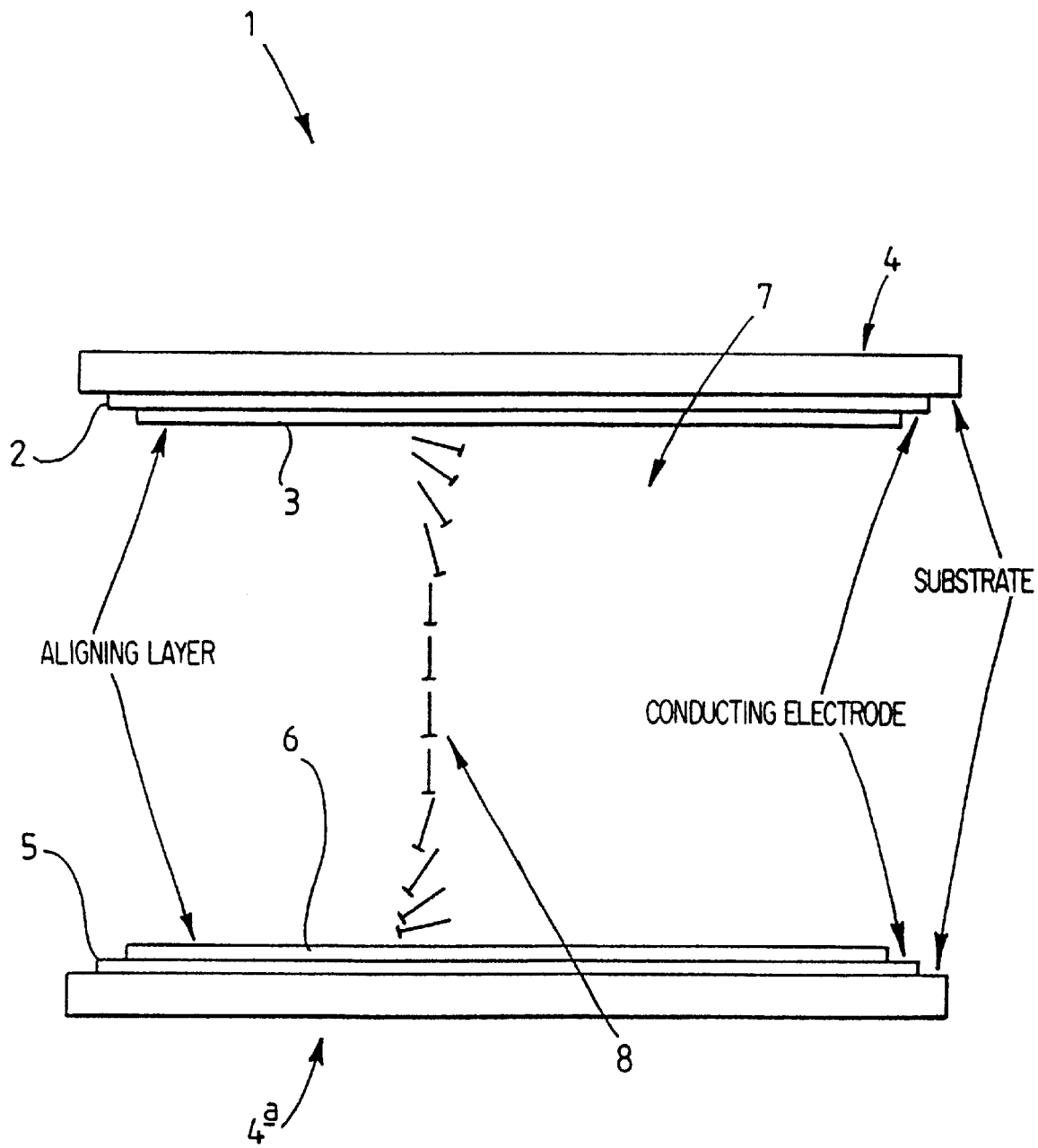
FIG. 4 is a schematic diagram illustrating the cell of FIG. 1 in the twist state, wherein the short bar indicates which end of the liquid crystal molecule is tilted out of the place of the diagram when twist is present.

FIG. 3 illustrates a possible arrangement of a liquid crystal display using the pi-cell 1 illustrated in FIGS. 1 and 2 but including the stabilising polymer as described hereinbefore. A linear polariser 10 having its polarisation vector at 45 degrees to the optic axis of the cell 1 is disposed on one side of the cell. On the other side of the cell are arranged a positive retarder 11, a negative retarder 12, and a linear polariser 1 3 whose polarisation vector is perpendicular to that of the polariser 10. The optic axis of the retarder 11 is perpendicular to the optic axis of the liquid crystal of the cell 1. The optic axis of the retarder 12 is perpendicular to the surfaces of the cell 1.

At a predetermined wavelength of visible light, the cell 1 provides a retardation which is variable between upper and lower values for drive voltage amplitudes between zero and an upper value, respectively. At the upper value, the retardation of the cell 1 has a finite value δ so that, for the predetermined wavelength, the retardation varies between $\lambda/2+\delta$ and δ. The retarder 11 provides a retardation of δ so that the effect of the cell 1 and the retarder 11 is to provide a retardation at the predetermined wavelength of between $\lambda/2$ and zero. The negative retarder 12 is provided to improve the viewing angle performance of the display.

Switching between the two states of the cell 1 in combination with the polarisers 10 and 13 causes the display to switch between transparent and opaque modes with respect to the predetermined wavelength. It is thus possible to provide a monochrome display which may be pixellated and provided with colour filtering to provide a colour display. As an alternative to colour filtering, because the response time of the display is so fast, colour may be generated by time-sequential techniques. The switching speed of the display is rapid and is similar to the switching speed of known pi-cell displays.

The use of positive retarders is described in EP 0 616 240 and the use of negative retarders is described in "Proceedings of the 13th International Display Research Conference", 1993, pp 149.

EXAMPLE 1

A two micrometer parallel aligned cell of the type illustrated in FIGS. 1 and 2 was filled with a mixture of E7 and a small quantity of a reactive mesogen (liquid crystal) RM82, which is a diacrylate monomer material which polymerises to form a cross-linked network. Both materials are available from Merck. The cell was switched into the V state and held at a voltage of 10 volts while the reactive mesogen was polymerised by exposure to ultraviolet light at a wavelength of 365 nanometers. Concentrations from 1.5% to 5% of the mixture by weight of the reactive mesogen were tested and it was found that, on removal of the electric field after polymerisation, the cell remained in the V state for concentrations above approximately 2%. Switching the cell between two voltages corresponding to retardation values of approximately $\lambda/2$ and 0 gave response times of approximately 1.5 milliseconds for the rise time and between 2 and 4 milliseconds for the decay time. Although these response times are longer than for a conventional pi-cell without the polymer, which are of the order of 1 and 2 milliseconds, respectively, they are comparable and sufficiently fast for most applications while having the advantage of the stabilised V state which extends the possible applications for the polymer stabilised pi-cell beyond those for the conventional pi-cell.

EXAMPLE 2

Example 1 was repeated but with the voltage applied to the cell reduced to just above the voltage for the transition from the V state to the twist state, as mentioned hereinbefore. The transition voltage was approximately 1.8 volts. The effect of this was to stabilise the V state with a less "homeotropic-like" director profile than in Example 1 so as to obtain a greater change in retardation for a given cell thickness and between given finite voltages. It was found that, for concentrations of the polymer of less than 2% by weight of the mixture, only the splay state existed after removal of the voltage. However, above concentrations of 3%, the cell remained stabilised in the V state after removal of the voltage. For intermediate concentrations, a mixture of states was obtained depending on the variation in cell thickness across the sample. The response times were similar to those for Example 1.

EXAMPLE 3

Example 1 was repeated for a 2% concentration of RM82 but using parallel aligned cells of different pretilt angles. It was found that increasing the pretilt angle favoured stabilisation of the V state. In a cell with a pretilt angle of 1 degree, the liquid crystal relaxed to the splay state on removal of the voltage. For a pretilt angle of 10 degrees, the liquid crystal remained stabilised in the V state at zero volts.

EXAMPLE 4

A pi-cell of thickness 12 micrometers was constructed and stabilised in the V state using a concentration of 2.85% of RM82 cured with an applied voltage of 1.8 volts. The cell was combined with a retarder, for instance as disclosed in EP 0 616 240 and illustrated in FIG. 3, to allow the effective operating voltage to be reduced. A retardation switching range of between zero and $\lambda/2$ was obtained for drive voltages between 10 and 2 volts, respectively. It was thus possible to provide a fast switching black/white mode liquid crystal display which was stabilised in the V state.

EXAMPLE 5

Example 1 was repeated but with the RM82 replaced by PN393 (available from Merck), which is non-mesogenic pre-polymer material comprising a mixture of monomeric and oligomeric compounds. A concentration of 2.5% by weight of the mixture of PN393 was used. A cell was produced in which the liquid crystal remained stabilised in the V state after removal of the electric field.

EXAMPLE 6

In preparing the examples described hereinbefore, some cells were stabilised in a state different from the V state upon removal of the electric field despite polymerisation having taken place in the V state. This occurred for relatively low concentrations of polymer and for relatively low electric fields, for instance 2% of RM82 cured at 1.8 volts. The stabilised state thus produced is thought to be equivalent to the splay state. However, no tilt walls were observed when a voltage was applied, indicating that the state was stabilised and that the switching process was slightly different from the non-polymer splay state. When a voltage was reapplied to the cell, the liquid crystal could not be switched into the V state. The cell had a greater retardation range than for a pi-cell operating in the V state but the decay response time was longer than for the V state, in particular about 20 milliseconds compared with approximately 2 to 4 milliseconds for the stabilised V state cell. This type of mode may also be formed by ultraviolet photopolymerisation with no voltage applied to the cell.

Although there was a reasonably well defined lower limit for the concentration of polymer in the mixture, namely about 2% by weight for most applied voltages during curing, an upper limit is less easy to define. For relatively high concentrations of polymer, the mixture forms a polymer dispersed liquid crystal with pockets of the liquid crystal being distributed in the polymer. For intermediate concentrations, the polymer forms interfaces which create isolated regions of the liquid crystal. In order to stabilise the V state or any other desired surface mode state, the concentration of polymer should be insufficient for such isolated regions to form. However, the concentration can easily be determined by experiment.

What is claimed is:

1. A method of making a surface mode liquid crystal device, comprising forming a cell containing a mixture of a liquid crystal and a pre-polymer, arranging the liquid crystal and a pre-polymer, arranging the liquid crystal in a predetermined surface mode state, and polymerizing or crosslinking the pre-polymer while maintaining the liquid crystal in the predetermined surface mode state, wherein the predetermined surface mode state is at least one of the V state, the splay state and the 180° twist state.

2. A method as claimed in claim 1, wherein the liquid crystal is arranged and maintained in the predetermined state by an electric field.

3. A method as claimed in claim 1, wherein the proportion of the pre-polymer in the mixture is greater than two percent by weight.

4. A method as claimed in claim 1, wherein the proportion of the prepolymer in the mixture is insufficient to form, when polymerised or cross-linked, isolated regions of the liquid crystal.

5. A method as claimed in claim 1, wherein the pre-polymer is a reactive mesogen.

6. A method as claimed in claim 1, wherein the pre-polymer contains a di-reactive compound.

7. A method as claimed in claim 1, wherein the pre-polymer is polymerised or cross-linked by ultraviolet irradiation.

8. A method as claimed in claim 1, wherein the cell comprises alignment layers for forming parallel alignment of the liquid crystal.

9. A method as claimed in claim 2, wherein the cell comprises alignment layers for forming parallel alignment of the liquid crystal, and wherein the electric field applied across the cell is sufficient to maintain the liquid crystal in the V state.

10. A method as claimed in claim 2, wherein the cell comprises alignment layers for forming parallel alignment of the liquid crystal, and wherein the electric field applied across the cell is insufficient to maintain the liquid crystal in the V state.

11. A method as claimed in claim 1, wherein the cell comprises alignment layers for forming anti-parallel alignment of the liquid crystal.

12. A surface mode liquid crystal device made by a method as claimed in claim 1.

13. A surface mode liquid crystal device comprising a cell containing a mixture of a liquid crystal in a predetermined surface mode state and a polymer for stabilising the predetermined surface mode state, wherein the predetermined surface mode state is at least one of the V state, the splay state and the 180° twist state.

14. A device as claimed in claim 13, wherein the proportion of the pre-polymer in the mixture is greater than two percent by weight.

15. A device as claimed in claim 13, wherein the cell comprises alignment layers forming parallel alignment of the liquid crystal.

16. A device as claimed in claim 13, wherein the predetermined surface mode is the V state.

17. A device as claimed in claim 13, wherein the predetermined surface mode is the splay state.

18. A device as claimed in claim 13, wherein the predetermined surface mode is the twist state.

19. A device as claimed in claim 13, wherein the cell comprises alignment layers forming anti-parallel alignment of the liquid crystal.

20. A method of making a surface mode liquid crystal device, comprising forming a cell containing a mixture of a liquid crystal and a pre-polymer, arranging the liquid crystal and a pre-polymer, arranging the liquid crystal in a predetermined surface mode state, and polymerizing or crosslinking the pre-polymer while maintaining the liquid crystal in the predetermined state, wherein the cell comprises alignment layers for forming parallel alignment of the liquid crystal molecules with a twist of substantially 180° or no twist.

21. A method of making a surface mode liquid crystal device, comprising forming a cell containing a mixture of a liquid crystal and a pre-polymer, arranging the liquid crystal and a pre-polymer, arranging the liquid crystal in a predetermined surface mode state, and polymerizing or crosslinking the pre-polymer while maintaining the liquid crystal in the predetermined state, wherein the cell comprises alignment layers for forming anti-parallel alignment of the liquid crystal molecules with a twist of substantially 180°.

* * * * *